(12) United States Patent
Ricks (10) Patent No.: US 9,746,957 B2
(45) Date of Patent: *Aug. 29, 2017

(54) MANAGING SENSORY INFORMATION OF A USER DEVICE

(71) Applicant: Amazon Technologies, Inc., Seattle, WA (US)

(72) Inventor: James Edward Ricks, Newcastle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/245,100

(22) Filed: Aug. 23, 2016

(65) Prior Publication Data

US 2016/0370935 A1 Dec. 22, 2016

Related U.S. Application Data

(63) Continuation of application No. 14/817,056, filed on Aug. 3, 2015, now Pat. No. 9,459,731, which is a
(Continued)

(51) Int. Cl.
*G09G 5/00* (2006.01)
*G06F 3/041* (2006.01)
(Continued)

(52) U.S. Cl.
CPC ............ *G06F 3/0416* (2013.01); *G06F 3/011* (2013.01); *G06F 3/041* (2013.01); *G06F 3/043* (2013.01);
(Continued)

(58) Field of Classification Search
None
See application file for complete search history.

(56) References Cited

U.S. PATENT DOCUMENTS 8,458,615 B2 * 6/2013 Chaudhri ............ G06F 3/04817 715/784
9,164,609 B2 10/2015 Ricks
(Continued)

FOREIGN PATENT DOCUMENTS

| CN | 102609130 | 7/2012 |
|----|-----------|--------|
| CN | 102714698 | 10/2012 |

(Continued)

OTHER PUBLICATIONS

U.S. Appl. No. 13/799,150 , "Non-Final Office Action", Nov. 6, 2014, 10 Pages.
(Continued)

*Primary Examiner* — Muhammad N Edun
(74) *Attorney, Agent, or Firm* — Kilpatrick Townsend & Stockton LLP (57) ABSTRACT

External mobile device sensors may be provided that are configured to manage sensory information associated with motion of objects external to the mobile device. In some examples, the object motion may be detected independent of contact with the device. In some examples, a device may include a screen with a first sensor (e.g., a touch sensor). The device may also include at least a second sensor external to the screen. Instructions may be executed by a processor of the device to at least determine when an object is hovering over a first graphical user interface (GUI) element of the screen. Additionally, in some cases, a second GUI element may be provided on the screen such that the second GUI element is rendered on the screen adjacent to a location under the hovering object.

20 Claims, 7 Drawing Sheets

Related U.S. Application Data continuation of application No. 13/799,150, filed on Mar. 13, 2013, now Pat. No. 9,164,609.

(51) Int. Cl.
| | | |
|---|---|---|
| *G06F 3/0488* | (2013.01) | |
| *G06F 3/042* | (2006.01) | |
| *G06F 3/043* | (2006.01) | |
| *G06F 3/01* | (2006.01) | |
| *G06K 9/00* | (2006.01) | |

(52) U.S. Cl.
CPC .......... *G06F 3/0421* (2013.01); *G06F 3/0425* (2013.01); *G06F 3/0436* (2013.01); *G06F 3/0488* (2013.01); *G06F 3/04883* (2013.01); *G06K 9/00288* (2013.01); *G06F 2203/04106* (2013.01); *G06F 2203/04108* (2013.01)

(56) References Cited

U.S. PATENT DOCUMENTS

| | | | |
|---|---|---|---|
| 9,459,731 | B2 | 10/2016 | Ricks |
| 2006/0103364 | A1 | 5/2006 | Adragna et al. |
| 2007/0064791 | A1 | 3/2007 | Okada et al. |
| 2009/0003867 | A1 | 1/2009 | Fujimoto |
| 2010/0287032 | A1 | 11/2010 | Wallace et al. |
| 2011/0191723 | A1 | 8/2011 | Wu et al. |
| 2011/0199470 | A1* | 8/2011 | Moller .................. G06F 1/1686 348/61 |
| 2012/0138012 | A1 | 6/2012 | Choi |
| 2012/0154293 | A1 | 6/2012 | Hinckley et al. |
| 2012/0169646 | A1 | 7/2012 | Geiger et al. |
| 2012/0235790 | A1* | 9/2012 | Zhao ...................... G06F 21/32 340/5.83 |
| 2012/0262398 | A1 | 10/2012 | Kim et al. |
| 2012/0280903 | A1* | 11/2012 | Fink ........................ G06F 3/012 345/156 |
| 2012/0311437 | A1* | 12/2012 | Weeldreyer ........... G06F 3/0488 715/252 |
| 2012/0320092 | A1 | 12/2012 | Shin et al. |
| 2013/0321340 | A1* | 12/2013 | Seo ........................ G06F 1/1641 345/174 |
| 2014/0267167 | A1 | 9/2014 | Ricks |
| 2015/0338999 | A1 | 11/2015 | Ricks et al. |

FOREIGN PATENT DOCUMENTS

| | | |
|---|---|---|
| JP | H06119090 | 4/1994 |
| JP | 2004046478 | 2/2004 |
| JP | 2006103364 | 4/2006 |
| JP | 2006520024 | 8/2006 |
| JP | 2009003867 | 1/2009 |
| JP | 2010287032 | 12/2010 |
| JP | 2011065490 | 3/2011 |
| JP | 2012138012 | 7/2012 |
| WO | 2012157272 A1 | 11/2012 |

OTHER PUBLICATIONS

U.S. Appl. No. 13/799,150 , "Notice of Allowance", Feb. 27, 2015, 5 pages.
U.S. Appl. No. 13/799,150 , "Notice of Allowance", Jun. 4, 2015, 5 pages.
U.S. Appl. No. 14/817,056 , "Non-Final Office Action", Feb. 2, 2016, 13 pages.
U.S. Appl. No. 14/817,056 , "Notice of Allowance", Jun. 8, 2016, 7 pages.
EP14778235.3 , "Extended European Search Report", Oct. 7, 2016, 9 pages.
JP2016-501341 , "Office Action", Nov. 8, 2016, 3 pages.
PCT/US2014/023782 , "International Search Report and Written Opinion", Jul. 14, 2014, 3 pages.
CN201480014942.3, "Office Action", dated Apr. 18, 2017, 6 pages.
JP2016-501341, "Notice of Decision to Grant", dated May 29, 2017, 6 pages.

* cited by examiner

MANAGING SENSORY INFORMATION OF A USER DEVICE

CROSS-REFERENCE TO RELATED APPLICATION

This application is a Continuation of U.S. patent application Ser. No. 14/817,056, filed Aug. 3, 2015, entitled "MANAGING SENSORY INFORMATION OF A USER DEVICE," issued on Oct. 4, 2016 as U.S. Pat. No. 9,459,731, which is a continuation of U.S. patent application Ser. No. 13/799,150, filed Mar. 13, 2013, issued on Oct. 20, 2015 as U.S. Pat. No. 9,164,609, entitled "MANAGING SENSORY INFORMATION OF A USER DEVICE," incorporated herein by reference in their entireties.

BACKGROUND

As mobile devices become more widespread and advanced, more and more users turn to them for enabling a multitude of different functions, features, and/or software applications. For example, mobile devices have become both location and context aware. Thus, they may be configured to detect a geographic location as well as other pertinent contextual information that may aid in the software application functionality being implemented. Additionally, as more and more features are enabled, consumers and developers alike are hoping that mobile devices may supplant desktop and/or laptop computers or at least be comparable from a feature availability standpoint. However, many mobile devices still face challenges that keep them from rivaling more standard desktop and/or laptop computing systems, at least in part because non-mobile devices tend to be configured with one or more peripheral devices that mobile devices lack. As such, managing sensory information as well other data that may generally be provided by desktop and/or laptop peripherals may pose challenges to the user device consumers as well as the developers.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, managing sensory information associated with a user device (e.g., a mobile phone, a tablet, an electronic book (e-book) reader, a laptop, or other portable computing device). In some examples, the sensory information may be managed to enable functionality of the user device. For example, in some cases, one or more sensors may monitor for motion or presence of an object and/or detect motion or presence of an object external to the user device (e.g., a finger, face, a non-body-part object, or the like). In other words, the sensors (e.g., infrared sensors, ultrasonic sensors, or the like) may be configured such that motion, heat, or other characteristics of an object may be detected, whether the object is moving or not. In some cases, based at least in part on the detected motion or presence, one or more device features may be activated.

In some examples, a user may hover his or her finger over a graphical user interface (GUI) element (e.g., an icon or a link) displayed on the screen of the user device. Hovering may include, but is not limited to, an object being within some detectable distance of the screen or other interface associated with a user device. Based at least in part on the detected hover, the user device may render or otherwise provide a hover element including, but not limited to, a pop-up window, a pop-under window, a pop-around window, or the like. In this way, the detection and/or management of the sensory information (e.g., the fact that an object is detected hovering over an element) may enable features not readily available without a peripheral device such as a mouse. Further, the sensory information may also be utilized to provide highlights over links or other icons, thus indicating to a user what link he or she will likely select if he or she touches the screen below the location of his or her hovering finger.

Additionally, in some examples, the sensory information may be utilized to prefetch, preprocess, or otherwise pre-emptively prepare for one or more potential user actions. For example, if a user moves his or her finger towards a set of icons, the user device may anticipate the selection of one of the set and be configured to cache the result such that when the user selects a particular link, the appropriate data has already been received and/or processed. In this way, the user may be given the data (e.g., a web page) much faster than if the device were to request the web page and/or process the data after selection by the user. Other examples may include detection that a user is about select a particular icon or link, and requesting a web page corresponding to the particular icon or link before the user actually touches the screen.

Further, in some examples, one or more different users may be able to log in or access secure content of the user device by placing the user device up to the user's face. For example, the sensory information may include face characteristic information and the sensors may be configured to detect a user's face, further detect the face characteristics, and/or log in the user. Additionally, in some examples, the user may be able to access a particular user profile or other state that is appropriate only for that user. In this way, a user's face may act as a password or token for accessing secure content or other user-specific information (e.g., profile, contacts, etc.) of the device. In at least one example, a low fidelity sensor grid (e.g., generated based at least in part on an array of sensors configured to detect motion external to and independent of contact with the device) may be configured to identify when an object is near the user device. Based at least in part on this identification, a more sensitive sensor grid (e.g., a higher fidelity sensor grid) may then be activated. In this way, the sensitive sensor grid may not be activated all the time in order to save battery power and/or processing resources. Additionally, in any of the above scenarios, a user may configure the sensors and/or activate/deactivate the sensors and/or the sensory information management system as desired.

Figure 1:
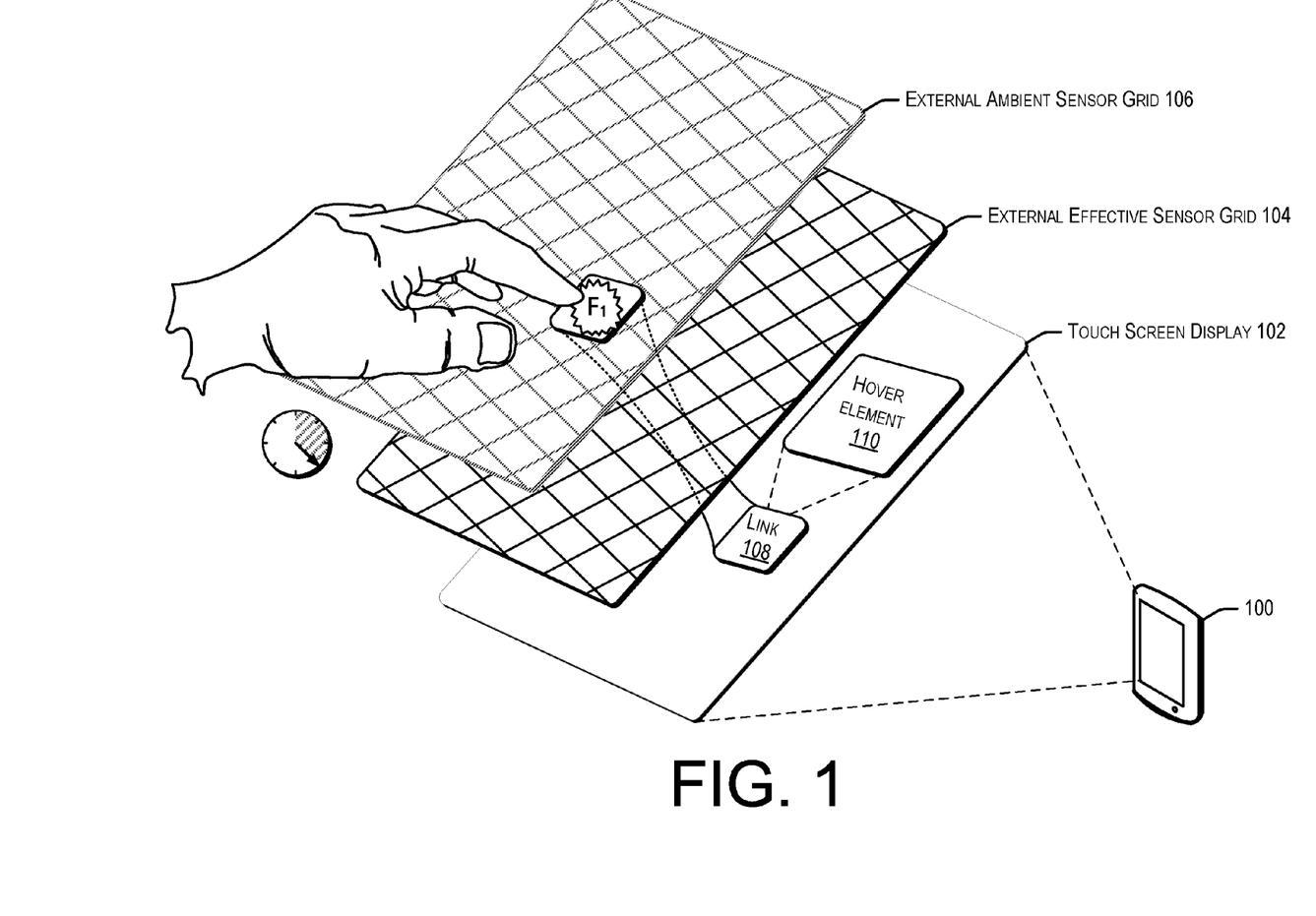
FIG. 1 illustrates an example device for implementing the management of sensory information described herein, according to at least one example.

FIG. 1 depicts an illustrative user device 100 such as, but not limited to, a mobile phone, a tablet, an e-book reader, an mp3 player, a remote control, or any other computing device that may be configured to implement the techniques described herein. For example, the user device 100 may be configured to manage sensory information including, but not limited to, motion, heat, conduction, etc., either external to a touch screen display 102 (e.g., independent of contact with the touch screen display 102), internal to the device 100 (e.g., based at least in part on a button or other actuator being pushed to complete an electrical circuit within the housing of the device 100), and/or directly on the touch screen display 102 (e.g., via the common method of selecting GUI icons on a display screen). As such, the sensory information may be any type of data collected by a sensor of the device 100 and stored, processed, or otherwise managed by the device 100 or a web service, web site, or other network resource in communication with the device 100 (e.g., via a wired or wireless network). As shown in FIG. 1, in some examples, the device 100 may include the touch screen display 102 as well as one or more sensor grids such as the external effective sensor grid 104 and/or the external ambient sensor grid 106. The sensor grids 104, 106 may not be visible to the human eye; they may extend a few millimeters, centimeters, or inches from the touch screen display 102; they may be projected as individual sensor paths in such a configuration that the grids 104, 106 may be effectively parallel with the touch screen display 102 but on different planes. Motion or presence of an object may be detected when the object crosses over or otherwise interferes with a sensor grid line, passes from one grid line to another, or the like. Speed and direction of an object may be detected by correlating relative interference or contact between one or more different sensor grid lines or paths, or from one sensor grid 104 to another sensor grid 106.

Additionally, each grid line shown in FIG. 1 of the grids 104, 106 may be projected or otherwise represent the sensory path of one or more individual sensors (e.g., arranged in an array or other clustering). For example, the sensors may be coupled to the device 100 in such a way that they surround the touch screen display 102, are embedded under the touch screen display 102, and/or are connected to the device 100 using any known techniques for providing the one or more sensor grids 104, 106. Further, any number and/or type of sensors may be utilized. As such, some sensors may detect motion while others may detect heat (e.g., infrared sensors, ultrasonic sensors, etc.). In some cases, when more sensors are utilized, a higher fidelity grid may be established, such as, for example, the external effective sensor grid 104. While in other cases, fewer sensors may be utilized to establish a lower fidelity grid, such as, for example, the external ambient sensor grid 106. The external ambient sensor grid 106 may be configured to detect ambient motion and/or ambient heat and may be less useful for more granular detection (e.g., the external ambient sensor grid 106 may be able to detect the presence of an object but may not be able to detect particular characteristics of the object). However, the external ambient sensor grid 106 may utilize less battery and/or processing resources than the external effective sensor grid 104. As such, in some examples, the ambient sensor grid 106 may be active more often (e.g., always active when the device 100 is powered on or always active when a user has set the sensory features to be on) than the effective sensor grid 104. Further, in some examples, the effective sensor grid 104 may remain inactive unless the user activates it, or at least until the ambient sensor grid 106 identifies an object to be sensed. As such, the battery power of the device 100 may be reserved until the ambient sensor grid 106 identifies an object to be monitored, sensed, tracked, etc.

As illustrated in FIG. 1, in some examples, the touch screen display 102 may be configured to provide, render, or otherwise display one or more links 108 (e.g., a hyper link, an icon that represents a link to electronically stored content, a link or icon that represents content or an application local to the device 100, or the like). While the link 108 may not be actually displayed on either of the grids 104, 106, a user may be able to place his or her finger over a location above the touch screen display 102 that corresponds to the location of the link 108 below. For example, the user may place his or her finger at a location F1 that corresponds to a location directly above the link 108. In this way, the user may "hover" over the link without actually touching the touch screen display 102. It should be noted, that while FIG. 1 illustrates the user "hovering" over the link 108 at a space above the device 100 that corresponds to the ambient sensor grid 106, any locations above the touch screen display 102 that correspond to any sensor grid and/or sensor path (such as, but not limited to, the effective sensor grid 104, a camera sensor, a sensor not part of either grid 104, 106 but still capable of detecting motion of persistence of an object) may suffice. However, in some examples, the location of the "hover" may be requested to be associated with the link 108 in some way (e.g., locally or based on a setting).

In some examples, once the user has placed an object (e.g., his or her finger) over a space that corresponds to a location above (e.g., directly above) the link 108, one of the grids 104, 106 or a sensor not related to a grid may detect the object. After a particular amount of time (e.g., 1 second, 2 seconds, more, or less), the sensors may identify that the object is "hovering." In some examples, the amount of time associated with a "hover" action may be preset or may be configurable by the user. In some examples, once the device 100 has identified that an object is hovering over a link 108 or other GUI element, a hover element 110 may be rendered adjacent to the link 108. The hover element 110 may be a link, icon, window, or other GUI element configured to provide additional information and/or options associated with the link 108. For example, the hover element 110 may include formatting/operating system (OS) options (e.g., copy link, move link, paste link, send link, etc.) and/or other more link-specific information (e.g., information about the link, information about a web page referenced by the link, etc.). Additionally, in some aspects, the hover element 110 may be provided on the touch screen display 102 such that the user may be able to view the hover element 110 without moving the object that is "hovering." For example, and as shown in FIG. 1, the hover element 110 may be rendered above the link 108 when the user's hand is covering the lower portion of the touch screen display 102. In other examples, the sensor grids 104, 106 may identify locations above the touch screen display 102 where other objects are located, and present the hover element 110 on the touch screen display 102 somewhere other than those locations so that the user will have an unobstructed view of the hover element 110. Further, in some examples, one grid (e.g., the ambient grid 106) may be configured to determine the unobstructed space (e.g., the location of a user's hand other than the finger that is "hovering") while another grid (e.g., the effective grid 104) may be configured to determine the "hover" of the object (e.g., a finger). Additionally, in some examples, when an object moves within the external ambient sensor grid 106, and remains there long enough, the external effective sensor grid 104 may be activated, which may allow for a greater fidelity of sensory perception and/or may allow for the provisioning of the hover elements 110. Further, the external ambient sensor grid 106 may be configured to detect gross-type functionality including, but not limited to, a swipe to indicate a page turn or track change.

In some examples, some of the sensors of the ambient sensor grid 106 may be infrared sensors while other sensors of the grid 106 may be ultrasonic sensors (or other types of sensors). Similarly, the sensors of the effective sensor grid 104 may also be made up of a combination of both infrared and ultrasonic (or other types of sensors). Still, in some examples, one sensor grid may comprise all of one of type of sensor (e.g., ultrasonic) while the other sensor grid may comprise all of another type of sensor (e.g., infrared). Further, in some examples, the coupling of both ultrasonic and infrared sensors may provide additional features. For example, the ultrasonic sensors may provide the ability to identify distance, and the infrared sensors may provide the ability to very precisely identify points within a grid (e.g., within either sensor grids 104, 106). As such, coupling measurements from both ultrasonic sensors and infrared sensors may provide a fairly precise identification of a topographical mapping of an object near the device 100.

Figure 2:
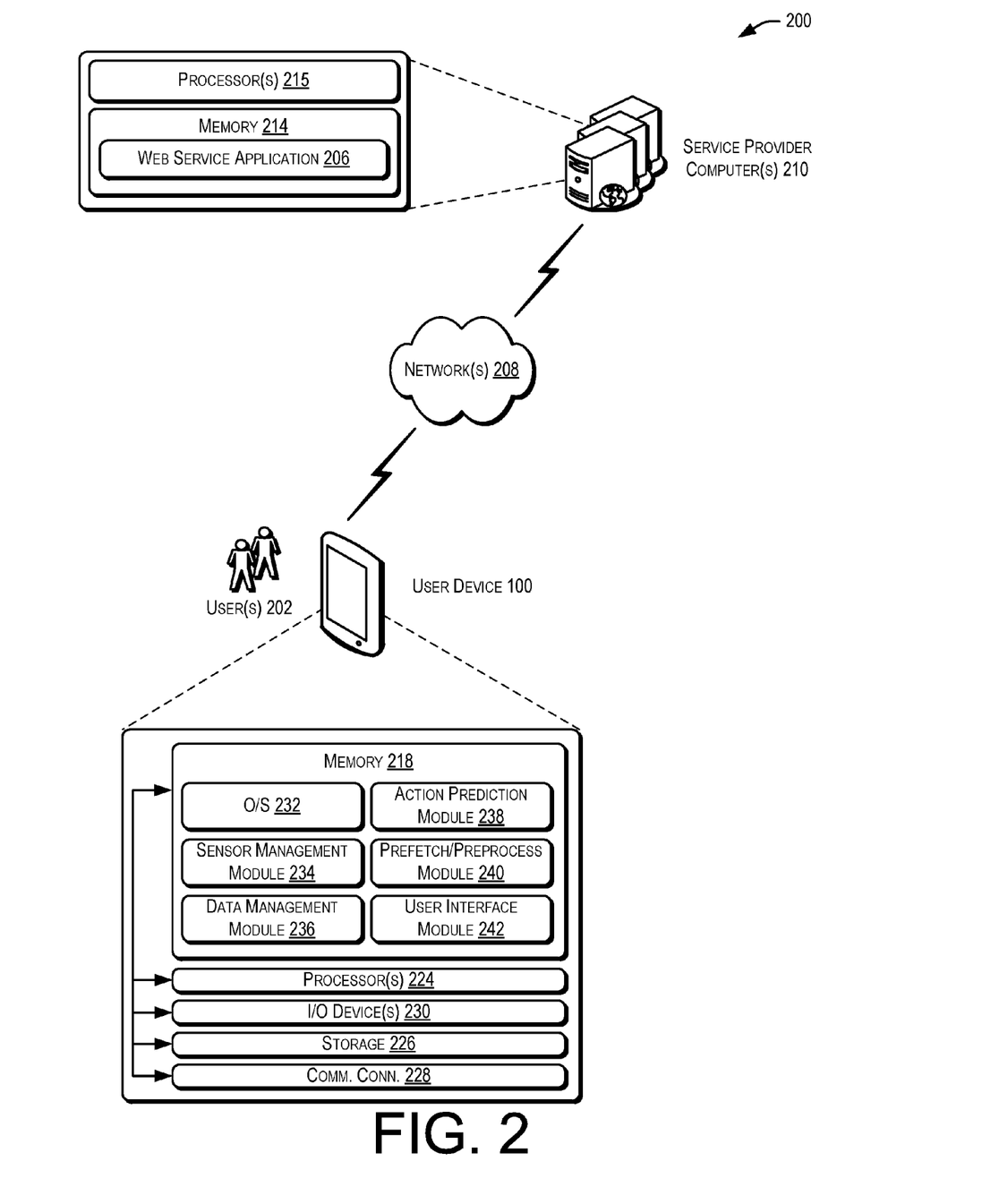
FIG. 2 illustrates an example architecture for implementing management of sensory information described herein that includes one or more web service computers and/or a user device connected via one or more networks, according to at least one example.

FIG. 2 depicts an illustrative system or architecture 200 in which techniques for managing sensory information may be implemented. In architecture 200, one or more users 202 (e.g., device owners, account holders, etc.) may utilize the user computing device 100 to access a web service application 206, a user account accessible through the web service application 206, or a web site or other network resource via one or more networks 208. In some aspects, the web service application 206, web site, and/or user account may be hosted, managed, and/or otherwise provided by a computing resources service or service provider, such as by utilizing one or more service provider computers 210. The one or more service provider computers 210 may, in some examples, provide computing resources such as, but not limited, web sites, web hosting, client entities, data storage, data access, management, virtualization, etc. The one or more service provider computers 210 may also be operable to provide web hosting, computer application development, and/or implementation platforms, combinations of the foregoing, or the like to the one or more users 202.

In some examples, the networks 208 may include any one or a combination of many different types of networks, such as cable networks, the Internet, wireless networks, cellular networks, and other private and/or public networks. While the illustrated example represents the users 202 accessing the web service application 206 over the networks 208, the described techniques may equally apply in instances where the users 202 interact with a service provider computer 210 via the user device 100 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

As described briefly above, the web service application 206 may allow the users 202 to interact with a service provider computer 210, such as to store, access, and/or manage data, develop and/or deploy computer applications, and/or host web content. The one or more service provider computers 210, perhaps arranged in a cluster of servers or as a server farm, may host the web service application 206. These servers may be configured to host a website (or combination of websites) viewable via the user device 100 or a web browser accessible by a user 202. Other server architectures may also be used to host the web service application 206. The web service application 206 may be capable of handling requests from many users 202 and serving, in response, various user interfaces that can be rendered at the user device 100 such as, but not limited to, a web site. The web service application 206 can be any type of website that supports user interaction, including social networking sites, electronic retailers, informational sites, blog sites, search engine sites, news and entertainment sites, and so forth. As discussed above, the described techniques can similarly be implemented outside of the web service application 206, such as with other applications running on the user device 100.

The service provider computers 210 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers 210 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment. In some examples, the service provider computers 210 may be in communication with the user device 100 via the networks 208, or via other network connections. The user device 100 may include one or more processors, perhaps arranged in a cluster, or as individual servers not associated with one another.

In one illustrative configuration, the service provider computers 210 may include at least one memory 214 and one or more processing units (or processor(s)) 215. The processor(s) 215 may be implemented as appropriate in hardware, computer-executable instructions, firmware, or combinations thereof. Computer-executable instruction or firmware implementations of the processor(s) 215 may include computer-executable or machine-executable instructions written in any suitable programming language to perform the various functions described.

The memory 214 may store program instructions that are loadable and executable on the processor(s) 215, as well as data generated during the execution of these programs. Depending on the configuration and type of service provider computers 210, the memory 214 may be volatile (such as random access memory (RAM)) and/or non-volatile (such as read-only memory (ROM), flash memory, etc.). The service provider computers 210 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM. Turning to the contents of the memory 214 in more detail, the memory 214 may include an operating system and one or more application programs or services for implementing the features disclosed herein including at least the web service application 206.

In some examples, the user device 100 may also be any type of computing device such as, but not limited to, a mobile phone, a smart phone, a personal digital assistant (PDA), a laptop computer, a thin-client device, a tablet PC, etc. In some examples, the user device 100 may be in communication with the service provider computers 210 via the networks 208, or via other network connections.

In one illustrative configuration, the user device 100 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of user device 100, the memory 218 may be volatile (such as random access memory (RAM)) and/or non-volatile (such as read-only memory (ROM), flash memory, etc.). The user device 100 may also include additional storage 226, which may include removable storage and/or non-removable storage. The additional storage 226 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 218 may include multiple different types of memory, such as static random access memory (SRAM), dynamic random access memory (DRAM), or ROM.

The memory 218 and the additional storage 226, both removable and non-removable, are examples of computer-readable storage media. For example, computer-readable storage media may include volatile or non-volatile, removable, or non-removable media implemented in any method or technology for storage of information such as computer-readable instructions, data structures, program modules, or other data. As used herein, modules may refer to programming modules executed by computing systems (e.g., processors) that are part of the user device 100 or the service provider computers 210. The memory 218 and the additional storage 226 are all examples of computer storage media. The user device 100 may also contain communications connection(s) 228 that allow the user device 100 to communicate with a stored database, another computing device or server, user terminals, and/or other devices on the networks 208. The user device 100 may also include input/output (I/O) device(s) and/or ports 230, such as for enabling connection with a keyboard, a mouse, a pen, a voice input device, a touch input device, a display, speakers, a printer, etc.

Turning to the contents of the memory 218 in more detail, the memory 218 may include an operating system 232 and the one or more application programs or services for implementing the features disclosed herein including a sensor management module 234, a data management module 236, an action prediction module 238, a prefetch/preprocess module 240, and/or a user interface module 242. The sensor management module 234 may be configured to manage the operation of the one or more sensors (e.g., infrared sensors, ultrasonic sensors, heat sensors, other motion sensors, etc.). In some cases, the sensor management module 234 may be enabled to activate, deactivate, program, reprogram, and/or otherwise control the use of the one or more sensors such that the grids 104, 106 of FIG. 1 or other sensory grids may be enabled. Additionally, the sensor management module 234 may manage other sensors such as, but not limited to, the touch screen sensors, microphones, etc., of the device 100. In some examples, the sensor management module 234 may also be configured to activate one sensor (or set of sensors) based at least in part on information identified by a different sensor (or different set of sensors).

In some aspects, the data management module 236 may be configured to manage the data received by the sensors of the device 100. For example, when the sensors identify or otherwise detect objects and/or motion within their range of detection, data may be collected. This data may be provided to the data management module 236 for processing and/or storage. In some aspects, the data may be stored in the memory 218 and/or may be provided to the service provider computers 210 for storage. Additionally, in some aspects, the action prediction module 238 may be configured to determine (also referred to as predict) one or more potential actions of a user. As used herein, a potential action of the user is an action (e.g., selecting a link or icon) that may be performed by the user but that has not yet been performed. In some examples, the potential actions of a user may include selection of each link or icon rendered on the touch screen display. However, prefetching and/or preprocessing the data associated with each link on the touch screen display would not be as efficient as programmatically predicting and/or determining a set or subset of selections that are more likely. As such, in conjunction with the data management module 236, the action prediction module 238 may be able to determine which links are more likely to be selected. For example, if a user's finger is moving towards a particular link, there may be a greater probability that the user will select that link as opposed to a link that the finger is moving away from. Additionally, the speed of a finger's movement may also be indicative of potential actions. For example, a finger that is "hovering" over a link may indicate that selection of that link or other adjacent links is likely probable. As such, the action prediction module 238 may predict that selection of the link under the "hover" may be a potential action. The action prediction module 238 may also be configured to allow software developers to configure or otherwise program different actions to be predicted and/or different instructions to be performed based at least in part on the predicted actions. For example, a game developer may configure the action prediction module 238 to include a list of potential actions that are specific to the game being developed.

Additionally, in some examples, the prefetch/preprocess module 240 may be configured to send web and/or other data requests to the service provider computers 210 based at least in part on the potential actions determined by the action prediction module 238. In this way, the device 100 may be able to predict which web pages to request on behalf of the users 202 before the users 202 actually request them. This enhancement may provide advanced speed and/or perceived speed for providing content to the users 202. For example, utilizing the web service application 206, a user 202 may be streaming video content via the device 100. Under certain scenarios, the service provider computers 210 may be configured in a hosted computing environment and may perform some processing of the video content (e.g., if the device 100 is configured as a thin client). As such, based at least in part on monitoring or otherwise detecting motion of the user 202, the modules 234, 236, 238, 240 may work together to predict when a user is going to pause and/or play the content. In this way, the pausing and/or playing commands may be prefetched or otherwise preprocessed to enhance the relative reaction time of the service provider computers 210 and the device 100, thus decreasing perceived latency of the system. Further, in some examples, the user interface module 242 may be configured to provide the GUI and/or GUI elements (including the links 108 and/or hover elements 110 of FIG. 1). The prefetch/preprocess module 240 may also be configured to allow software developers to configure or otherwise program different instructions (e.g., gaming and/or multimedia actions) to be performed based at least in part on the motions or objects placed in front of the device 100.

Additional types of computer storage media that may be present in the user device 100 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the user device 100. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

A few additional examples of the operations of the user device 100 are also described in greater detail below with reference to at least FIGS. 3-7.

Figure 3:
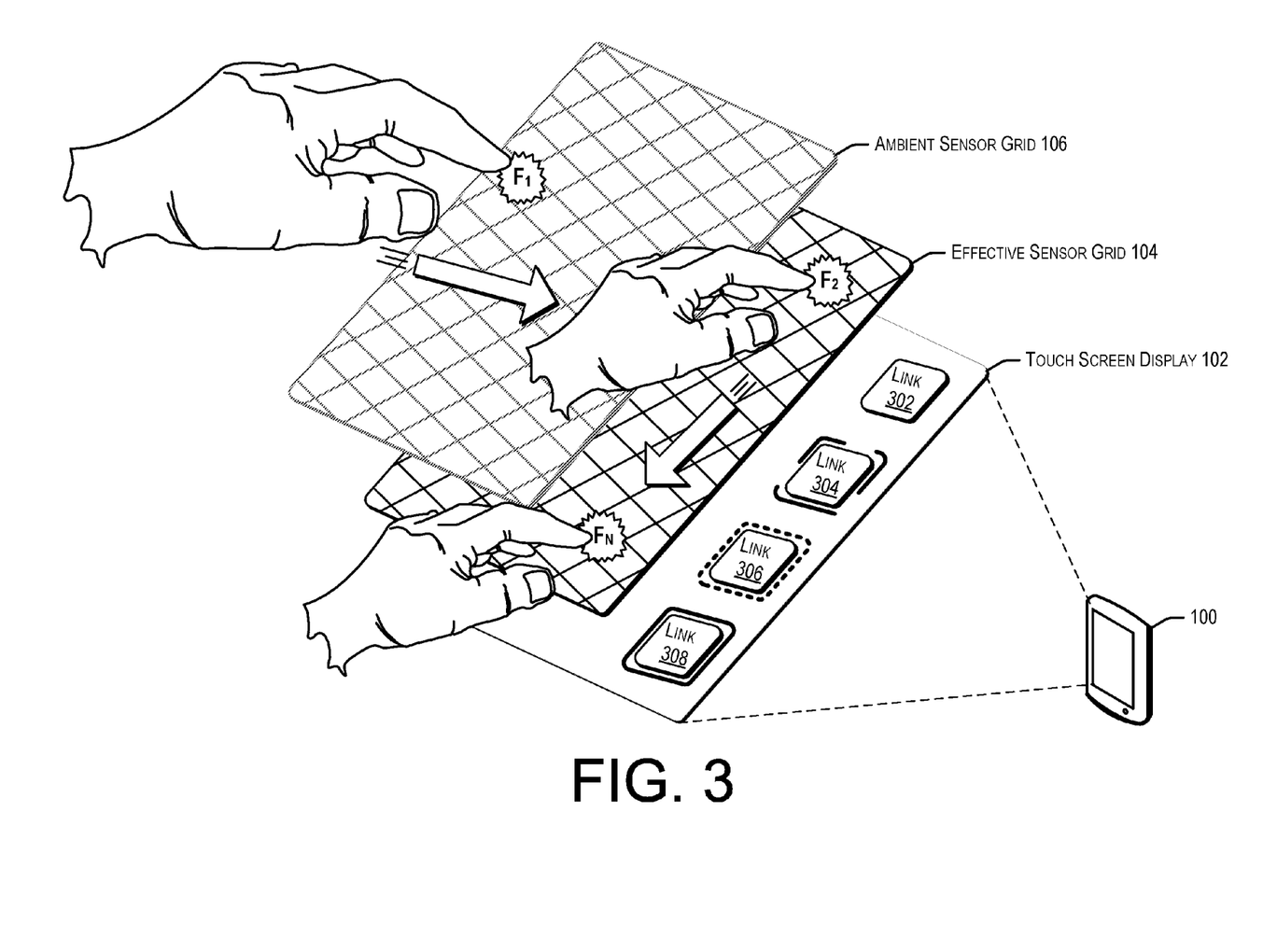
FIG. 3 illustrates the example device for implementing the management of sensory information described herein, according to at least one other example.

FIG. 3 illustrates additional examples of the management of sensory data of a user device described herein. For example, FIG. 3 illustrates the user device 100 described with reference to FIGS. 1 and 2 with the touch screen display 102, the effective sensor grid 104, and/or the ambient grid 106 as described above. In this non-limiting example, a user may move his or her hand towards the touch screen display 102 in such a way that the ambient sensor grid 106 may detect the presence or motion of the user's finger at F1. However, FIG. 3 is not intended to illustrate the user actually touching the ambient sensor grid 206. Instead, the user's finger may cross through the plane of sensor paths or otherwise be detectable by the sensors that are configured to enable the ambient sensor grid 106. In some examples, at this stage, when F1 occurs, the effective sensor grid 104 may not be activated. However, in some examples, it may always be activated or, as noted above, the user may configure when and/or how long the effective sensor grid 104 is to be activated.

In some examples, the F1 signal may be sent to the sensor management module 234, which may be configured to activate the effective sensor grid 104. That is, the effective sensor grid 104 may be dormant until the ambient sensor grid detects an object, item, or motion for the effective sensor grid 104 to monitor. As such, the effective sensor grid 104 may become activated in time for the effective sensor grid 104 to sense the user's hand at F2. Here, again, the user may not yet be in contact with the device 100 itself. However, the effective sensor grid 104 may be able to detect the location, direction of movement, and/or speed of movement of the user's hand with relation to the touch screen display 102 and/or the device 100 itself. Further, as described above, in some examples, the effective sensor grid 104 may send the location, motion, speed, etc., information to the sensor management module 234 which may work together with at least the action prediction module 238 and/or the prefetch/preprocess module 240 to determine which of links 302, 304, 306, 308, the user may select. As the user moves his hand from F2 to FN, the modules of the device may begin making requests to a web server or other network-based resource to receive web pages, content, or other information in anticipation of the user selecting the links 302, 304, 306, 308.

In some examples, the speed of the user's hand may be useful as well. For example, if the user's hand is moving from F2 to FN slowly, a prediction that the user may select link 304 may be more accurate than that of link 308. However, if the opposite were true, and the user's hand was moving from F2 to FN at a faster pace, the probability of the user selecting link 308 or no link at all may increase. As such, based at least in part on the determined probabilities of potential actions being actual actions, the device may prioritize the prefetching and/or preprocessing requests. For example, a list of prefetch requests may be ranked and then processed in order. The ranked list may change dynamically as new data associated with the motion or presence of the user's hand may be received. Further, in some examples, a GUI element (e.g., a highlighting or border) may be provided over the one or more links to indicate a perceived location of the user's finger. For example, the border around link 308 may be visible when the user's finger is detected at FN. In this way, the user may be able to tell where his or her finger is in relation to the links. This may be useful especially when links or icons on the touch screen display 102 are small and it may be difficult to tell what link a user may select when they touch the screen. As shown in FIG. 3, in some examples, the bordering element may slowly diminish as the fingers move, for example, indicating that the user's finger was above link 304 a few moments ago, then was above link 306 after that, and finally is now over link 308. Other GUI elements or indicators for helping the user interact with the GUI may be enabled as desired.

Figure 4:
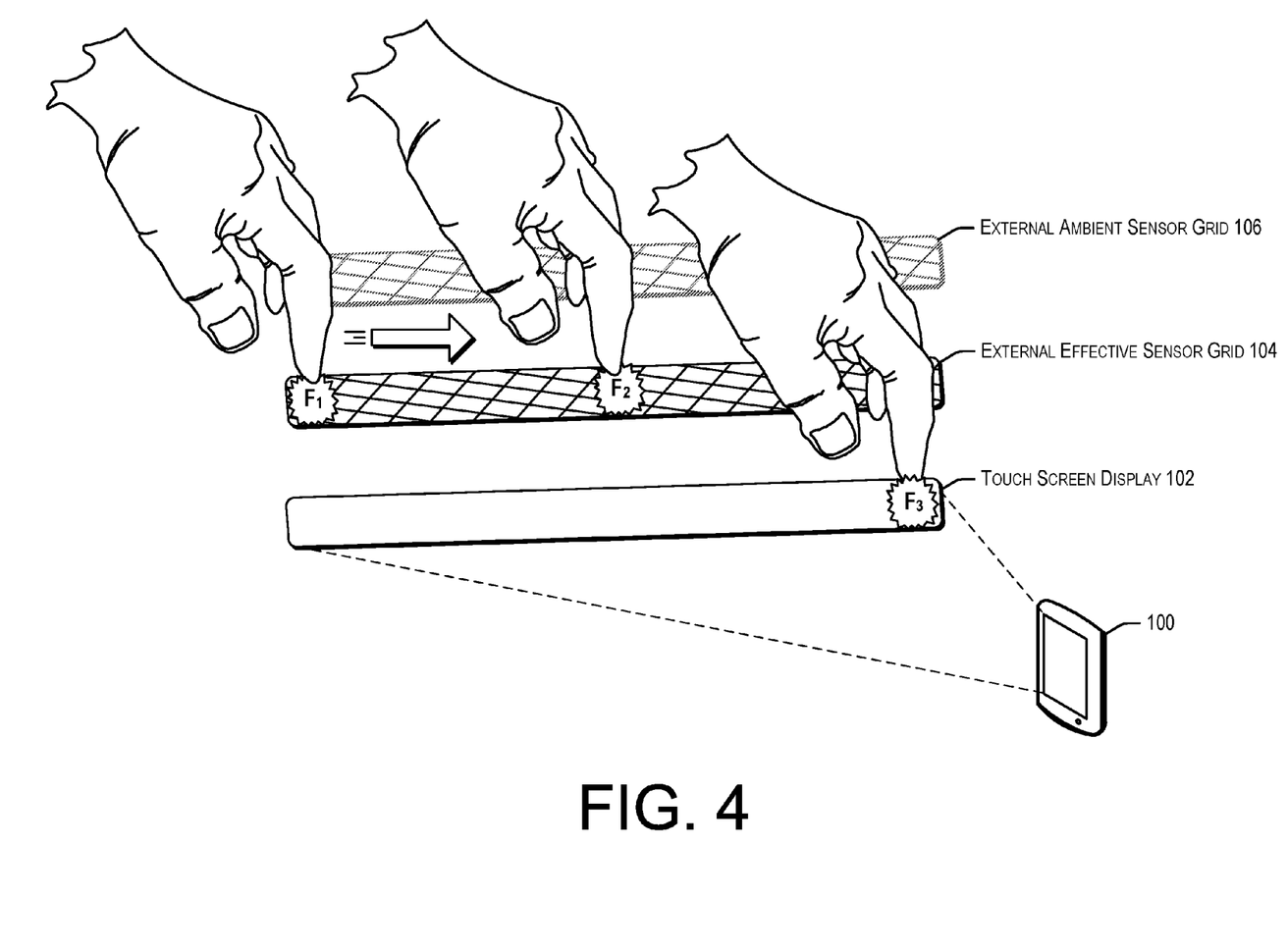
FIG. 4 illustrates the example device for implementing the management of sensory information described herein, according to at least one other example.

FIG. 4 illustrates additional examples of the management of sensory data of a user device described herein. In this figure, the device 100 is shown again with a touch screen display 102, an effective sensor grid 104, and/or an ambient sensor grid 106. In this figure, however, the touch screen display 102 and sensor grids 104, 106 are illustrated in a cross-section view to illustrate perspectives with relation to the device 100 and/or the touch screen display 102. For example, in some aspects, the user's finger at F1 and/or F2 may be sensed by either or both of the sensor grids 104, 106; yet this sensing and/or detection of the finger may be independent from actual contact with the touch screen display 102, shown at F3. Additionally, in some examples, as noted above, the ambient sensor grid 106 may first detect the presence of the user's hand and then activate the effective sensor grid 104. Further, any other objects may be sensed, detected, and/or monitored by the sensor grids 104, 106. For example, a user may place an object (e.g., an item for sale in a catalog or the like) in proximity to the device 100, and one or more of the grids 104, 106 may be able to determine the identity and/or characteristics of the object. For example, if the user wanted to sell an item through an electronic retailer, the user may place the item in front of the touch screen display 102, and the sensor grids 104, 106 may be able to identify the item and/or provide information to the electronic retailer on behalf of the user. Alternatively, the user may wish to purchase a similar item, and the device (e.g., upon identifying the item) may find similar items for sale by the same and/or other electronic retailers.

Additionally, as described above, in some examples, the ambient sensor grid 106 may also be configured to detect and/or analyze gross motions or other lower-fidelity actions. These motions and/or actions may be utilized to effectuate multimedia or gaming operations of the device 100. For example, swiping one's hand across the device may be detected by the low-fidelity sensors (e.g., the ambient sensor grid 106) to advance a song, turn a page, swing an object in a game, scroll through options, etc.) with or without activating or utilizing the effective sensor grid 104. Additionally, in some examples, the device 100 may be a vehicle-embedded device (or device embedded into any type of unit with which a user may interact) that can detect and/or analyze motions occurring several inches away from the touch screen display 102. In this way, a driver or operator of the vehicle may be able to activate options (e.g., next or last song and/or increase or decrease volume when playing music, next direction when receiving directions, etc.) of the device 100 while safely operating the vehicle.

Figure 5:
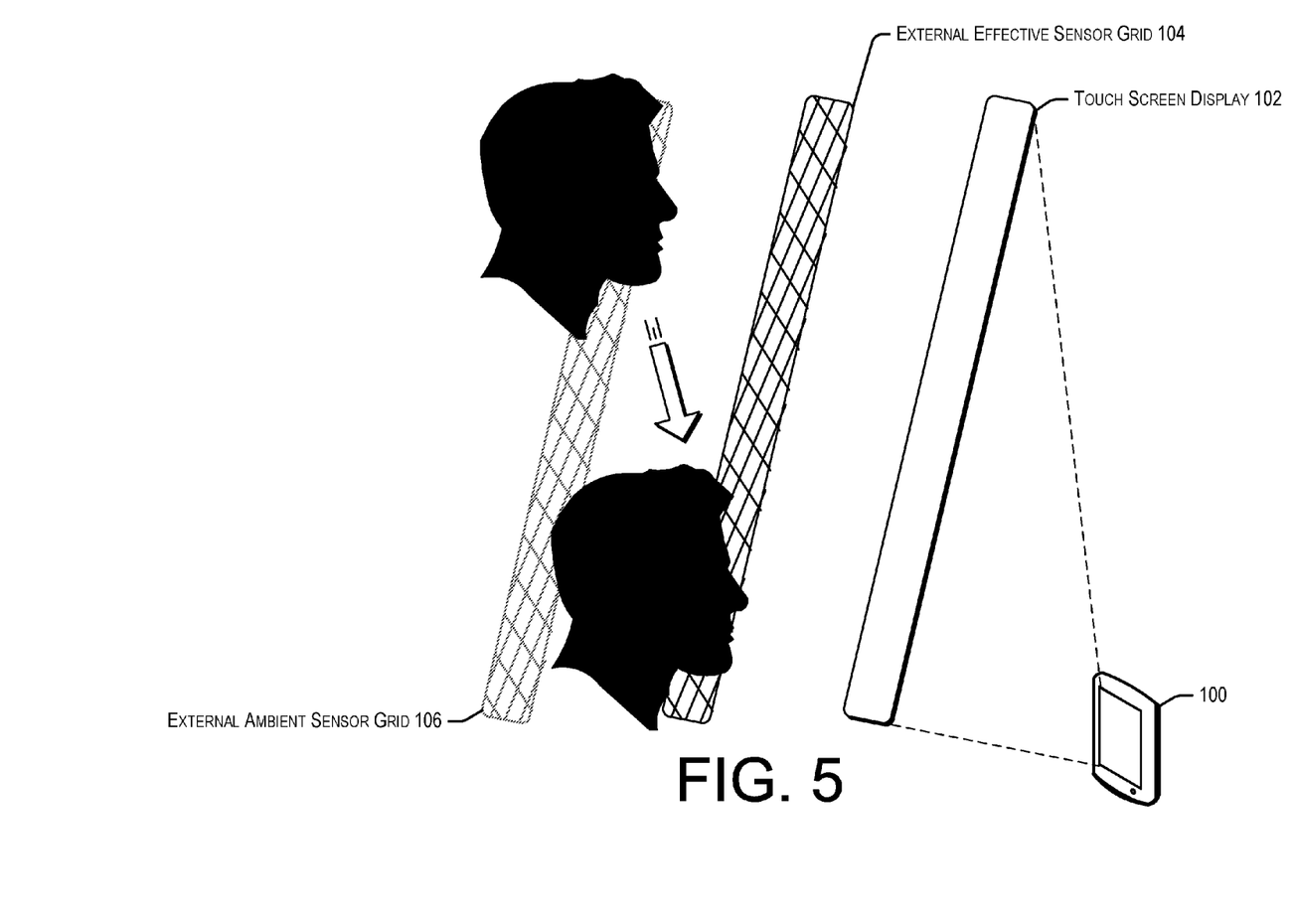
FIG. 5 illustrates the example device for implementing the management of sensory information described herein, according to at least one other example.

FIG. 5 illustrates additional examples of the management of sensory data of a user device described herein. In this figure, the device 100 is shown again with a touch screen display 102, an effective sensor grid 104, and/or an ambient sensor grid 106. In this figure, again, the touch screen display 102 and sensor grids 104, 106 are illustrated in a cross-section view to illustrate perspectives with relation to the device 100 and/or the touch screen display 102. FIG. 5 illustrates an example where a user may utilize the sensor grids 104, 106 and/or the other features of the sensory management to log into the device 100 with his or her face. In this way, the user's face may be identifiable in such a way that the device 100 may allow log in or other access to secure content based at least in part on identified face of the user. In some examples, the user may hold the device 100 up to his or her face, and at a distance, the ambient sensor 106 may identify that a face is present. In some examples, as noted above, the ambient sensor grid 106 may then enable activation of the effective sensor grid 104. In some examples, the effective sensor grid 104 may then detect face characteristics such that the user can be identified.

The user may store a face scan with the device (e.g., with different facial hair arrangements and/or haircuts) such that the device 100 may recognize them even if changes occur to the user's face or profile. Additionally, in some examples, multiple users that utilize the same device may be able to log into particular accounts or access user/account-specific secure content. While a face is shown in FIG. 5 moving from the relative top of the touch screen display 102 to the relative bottom of the touch screen display 102, the functionality is not intended to be limited as such. In other words, the face need only be moved closer to the device 100 and/or the touch screen display 102 (in some examples) in order to be detected. However, in other examples, both sensor grids 104, 106 may be configured to detect items, fingers, faces, etc., at the same distance from the device 100. For example, less and/or different sensors may be utilized to implement the ambient sensor grid 106 than for the effective sensor grid 104, even though they may project sensor paths at the same distance from the device 100. Further, in some examples, the effective sensor grid 104 may be made up of the same sensors that activate the ambient sensor grid 106 plus some additional sensors that are not active while the ambient sensor grid 106 is active.

Additionally, in some examples, there may be multiple states of user face registration with the device. For example, a user may register an emotionless face topography with the device 100, and also register an emotional/expressive face topography (e.g., a smile, a scowl, a funny expression, etc.). In some cases, the ambient sensor grid 106 may identify the emotionless face of the user or at least identify that a face has entered near the device 100. The effective sensor grid 104 may then be configured to identify when the user is making the expression that was saved as the password for logging into the device. In this way, additional security may be enabled such that a user may not be able to be coerced into unlocking his or her device. Instead, the user may unlock the device only by providing the expression that was saved as the password. Further, in some examples, the user may place his or her face in one of many different angles or distances with respect to the sensors of the device 100. For example, the user may be able to log in to the device 100 without placing his or her face in the exact same position with reference to the device 100 each time. Additionally, in some examples, each time a user logs in using his or her face, the device 100 may add to a library of face-passwords to eventually learn the face of the user such that any angle of the face or change to the face (e.g., blemishes, facial hair, glasses, etc.) may be satisfactory to log in the user.

Figure 6:
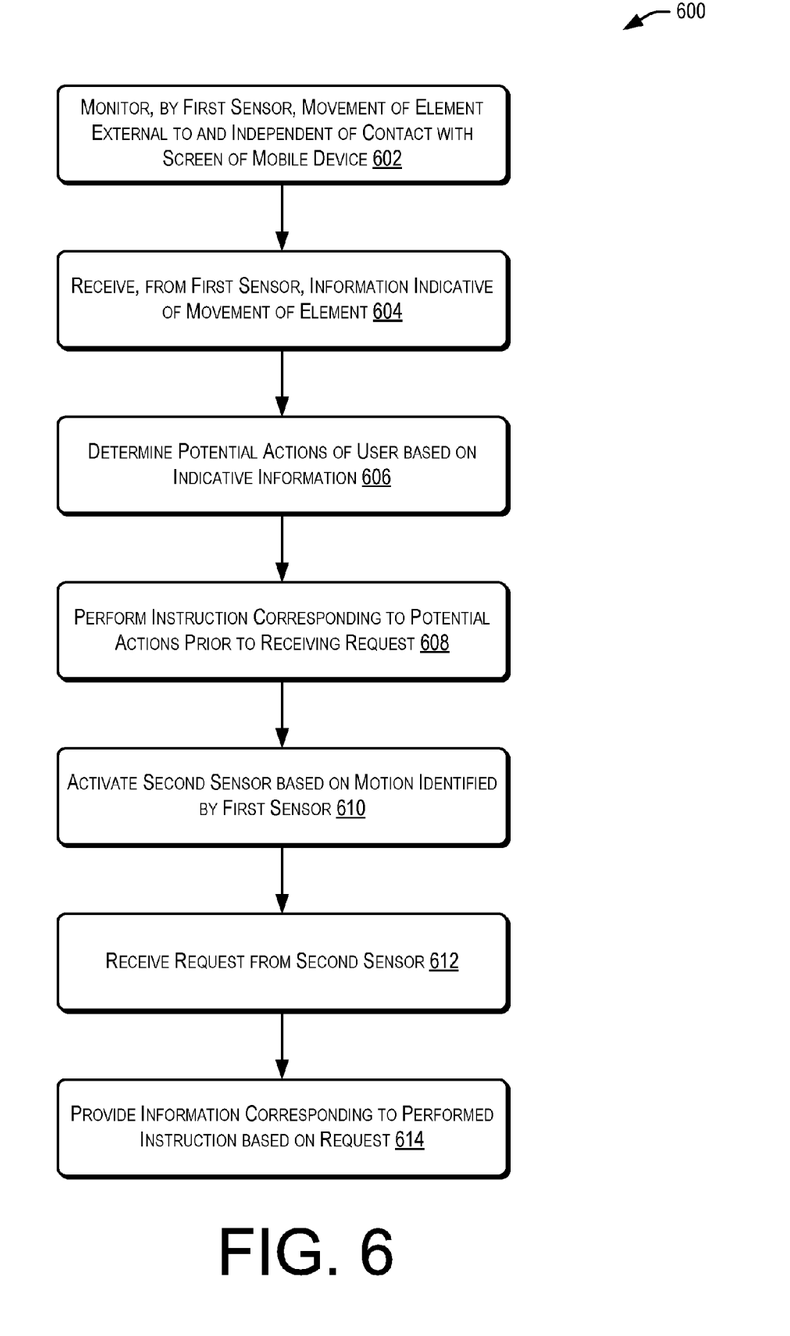
FIG. 6 illustrates an example flow diagram of a process for implementing the management of sensory information described herein, according to at least one example.
Figure 7:
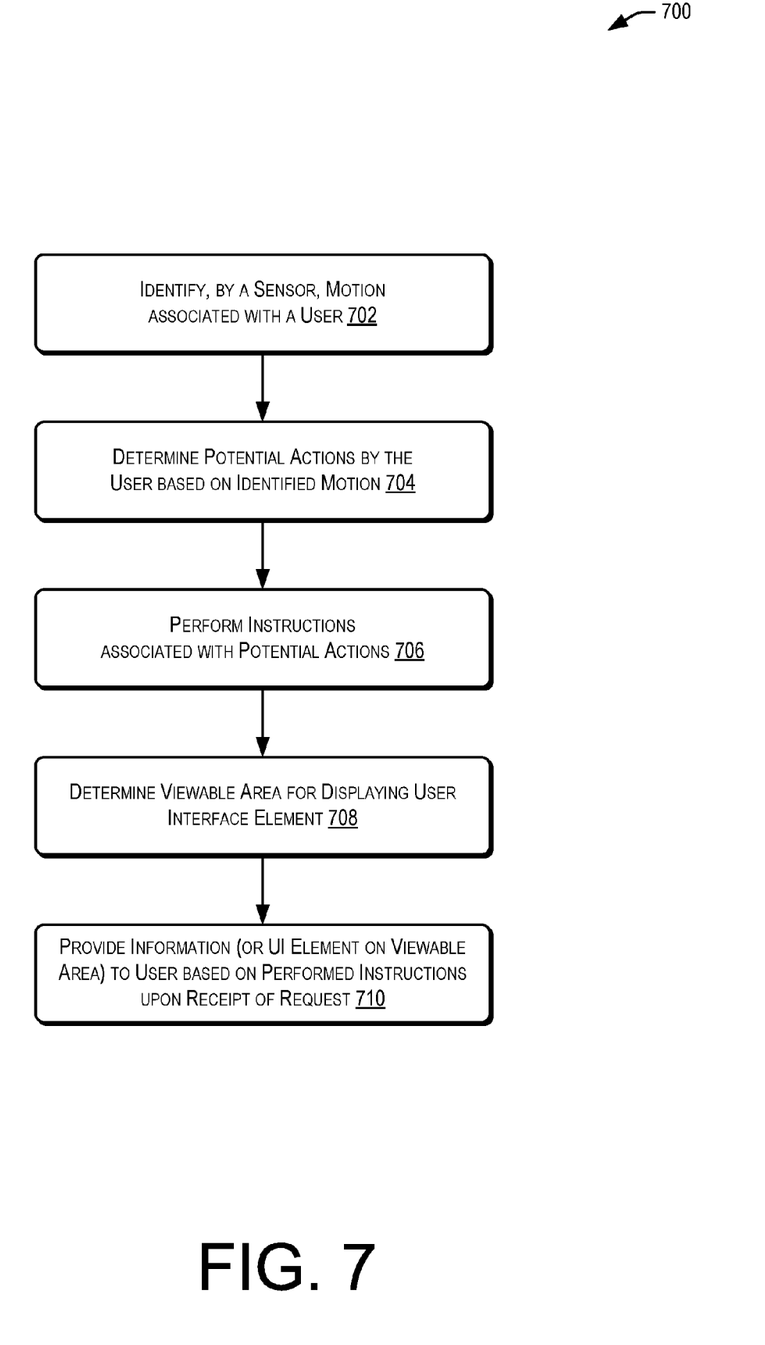
FIG. 7 illustrates another example flow diagram of a process for implementing the management of sensory information described herein, according to at least one example.

FIGS. 6 and 7 illustrate example flow diagrams showing respective processes 600 and 700 for managing sensory data of a user device. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the user device 100 (e.g., utilizing at least one of the sensor management module 234, the action prediction module 236, and/or the prefetch/preprocess module 240) shown in FIG. 2 may perform the process 600 of FIG. 6. The process 600 may begin by monitoring movement of an object external to and independent of contact with a touch screen display of a user device at 602. The monitoring may be performed by at least a first sensor of the user device. At 604, the process 600 may receive, from the first sensor, information indicative of movement or presence of the object. That is, the first sensor may identify that the object is moving above or over the device or it may identify that the object is present (or otherwise not moving but still there). At 606, the process 600 may determine potential actions of a user based at least in part on the indicative information received from the first sensor. In some examples, the process 600 may also perform instructions corresponding to the potential actions prior to receipt of a request from the user at 608. In other words, the process 600 may prefetch web data and/or preprocess data associated with potential requests in anticipation that the user may make such selection. At 610, the process 600 may activate a second sensor based at least in part on the object motion and/or existence identified by the first sensor. At 612, the process 600 may receive a request from a second sensor. The second sensor may be configured as a motion sensor with higher fidelity than the first sensor or a touch-sensitive sensor (e.g., of a touch screen display). Additionally, in some examples, the process 600 may end at 614, where the process 600 may provide information corresponding to the performed instruction based at least in part on the request received at 612 from the user.

FIG. 7 illustrates an example flow diagram showing process 700 for managing sensory data of a user device. The user device 100 (e.g., utilizing at least one of the sensor management module 234, the action prediction module 236, and/or the prefetch/preprocess module 240) shown in FIG. 2 may perform the process 700 of FIG. 7. The process 700 may begin by identifying, by a sensor, motion and/or presence associated with a user at 702. For example, the sensor may identify motion of the user or an object associated with the user and/or the sensor may identify the presence of the user or an object associated with the user. At 704, the process 700 may determine a potential action by the user based at least in part on the identified motion and/or presence. At 706, the process 700 may perform instructions associated with the potential actions. Additionally, in some examples, the process 700 may determine a viewable area for displaying a user interface element at 708. In some aspects, the viewable area may be based at least in part on an area of the screen where the user's view is not being blocked (e.g., based at least in part on the objects detected and/or identified in front of the touch screen display). For example, if a user's hand blocks the user's view of the lower portion of the touch screen display, the viewable area may include all or some areas of the touch screen display other than the lower portion being blocked by the hand. Further, the process 700 may end at 710, where the process 700 may provide information to the user based at least in part on the performed instructions. The process 700 may also provide the UI element (e.g., a hover element or the like) on the determined viewable area at 710. This information and/or UI element may be provided upon receipt of a request from the user.

Illustrative methods and systems for managing sensory information of a user device are described above. Some or all of these systems and methods may, but need not, be implemented at least partially by architectures such as those shown at least in FIGS. 2-7 above.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computing device, comprising:
   a screen;
   a first sensing means for sensing, at a first fidelity, movement of an object external to and independent of contact with the screen;
   a second sensing means for sensing the movement at a second fidelity higher than the first fidelity; and
   a memory that stores computer-executable instructions; and
   a processor means for accessing the memory and executing the computer-executable instructions to at least:
      receive, from the first sensing means, first information indicative of the movement based at least in part on the movement being sensed by the first sensing means;
      determine a potential action of a user of the computing device based at least in part on the first information;
      perform an instruction corresponding to the potential action of the user prior to receiving a request to perform the potential action;
      receive, from the second sensing means, an indication of the request based at least in part on the movement being sensed by the second sensing means; and
      provide second information corresponding to the performed instruction based at least in part on the indication of the request.

2. The computing device of claim 1, wherein the first sensing means and the second sensing means form a sensor grid external to the screen.

3. The computing device of claim 2, wherein the sensor grid is configured to sense at least one of: the object or the movement of the object occurring external to the screen.

4. The computing device of claim 1, wherein the first sensing means comprises an ambient sensor, and wherein the second sensing means comprising an effective sensor.

5. The computing device of claim 1, wherein the first sensing means comprises at least one of an infrared sensor or an ultrasonic sensor, and wherein the second sensing means comprises a touch screen sensor.

6. The computing device of claim 1, wherein the processor means upon executing the computer-executable instructions further activates the second sensing means based at least in part on the movement being sensed by the first sensing means.

7. The computing device of claim 1, wherein the first information indicative of the movement identifies a parameter associated with the movement, and wherein the potential action is determined based at least in part on the parameter.

8. The computing device of claim 7, wherein the parameter comprises at least one of: a speed of the movement, a direction of the movement, a difference in time between the movement monitored by the first sensing means and movement of the object sensed by the second sensing means, or a difference in time between sensing of the object by the first sensing means and sensing of the object by the second sensing means.

9. The computing device of claim 1, wherein performing the instruction comprises at least one of: providing a request to a server, providing information to an external computing system, requesting information processing by a web service, or processing data associated with the potential action.

10. A computer-implemented method, comprising:
a step for receiving, from a first sensor of a computing device, first information indicative of a movement of an object external to and independent of contact with a screen of the computing device, the movement sensed by the first sensor at a first fidelity;
a step for determining a potential action of a user of the computing device based at least in part on the first information;
a step for performing an instruction corresponding to the potential action of the user prior to receiving a request to perform the potential action;
a step for receiving, from a second sensor of the computing device, an indication of the request based at least in part on the movement being sensed by the second sensor at a second fidelity higher than the first fidelity; and
a step for providing second information corresponding to the performed instruction based at least in part on the indication of the request.

11. The computer-implemented method of claim 10, wherein the potential action comprises at least one of: a hover over a user interface element at the screen or a selection of the user interface element.

12. The computer-implemented method of claim 10, wherein the movement of the object is associated with a first user interface element displayed at the screen, and wherein the second information comprises a second user interface element displayed on an area of the screen adjacent to the first user interface element.

13. The computer-implemented method of claim 12, further comprising: determining a viewable area of the screen based at least in part on one or more of a size of the object or a location of the object, wherein the viewable area is sized for displaying the second user interface element.

14. The computer-implemented method of claim 12, wherein the potential action comprises a user selection of at least one of: the first user interface element or the second user interface element.

15. The computer-implemented method of claim 10, wherein performing the instruction comprises pre-fetching the instruction prior to receiving the request to perform the potential action.

16. The computer-implemented method of claim 15, wherein performing the instruction further comprises displaying an indication of the potential action on the screen.

17. A computing device, comprising:
a screen;
a first sensing means for sensing, at a first fidelity, movement of an object external to and independent of contact with the screen;
a second sensing means for sensing the movement at a second fidelity higher than the first fidelity; and
a management means for managing actions of the computing device based at least in part on the movement, the managing comprising:
receiving, from the first sensing means, first information indicative of the movement based at least in part on the movement being sensed by the first sensing means;
determining a potential action of a user of the computing device based at least in part on the first information;
performing an instruction corresponding to the potential action of the user prior to receiving a request to perform the potential action;
receiving, from the second sensing means, an indication of the request based at least in part on the movement being sensed by the second sensing means; and
providing second information corresponding to the performed instruction based at least in part on the indication of the request.

18. The computing device of claim 17, wherein the first sensing means and the second sensing means form a sensor grid for identifying the object independent of the contact with the screen.

19. The computing device of claim 17, wherein the second sensing means is configured to sense the movement of the object independent of the contact of the object with the screen.

20. The computing device of claim 17, wherein the first information indicative of the movement of the object identifies a location of the object relative to a user interface element on the screen, wherein performing the instruction comprises indicating on the screen a hover over the user interface element based at least in part on the location of the object.

* * * * *